United States Patent [19]
McEwen

[11] 3,935,105
[45] Jan. 27, 1976

[54] TUBULAR FILTER IN SETTLER

[75] Inventor: Stephen N. McEwen, Bowling Green, Ohio

[73] Assignee: Henry Manufacturing Co., Inc., Bowling Green, Ohio

[22] Filed: Nov. 12, 1974

[21] Appl. No.: 523,035

[52] U.S. Cl. .............. 210/138; 210/193; 210/237; 210/333; 210/411; 210/416
[51] Int. Cl.² .................. B01D 27/12; B01D 29/32
[58] Field of Search ........... 210/193, 206, 207, 230, 210/237, 238, 323, 338, 497, 527, 75, 82, 138–140, 411, 416, 108, 143; 259/4, 9, 10, 45, 96

[56] References Cited
UNITED STATES PATENTS

| | | | |
|---|---|---|---|
| 1,696,735 | 12/1928 | Scoville | 210/323 X |
| 2,559,614 | 7/1951 | Hapman | 210/323 X |
| 2,720,314 | 10/1955 | Booth | 210/193 X |
| 2,909,285 | 10/1959 | Besler | 210/323 X |
| 2,916,148 | 12/1959 | Crane et al. | 210/527 |
| 2,970,696 | 2/1961 | Mummert | 210/138 |
| 3,151,065 | 9/1964 | Smith et al. | 210/193 X |
| 3,300,094 | 1/1967 | Rockola | 259/4 X |
| 3,341,023 | 9/1967 | Seter | 210/237 |
| 3,635,343 | 1/1972 | Holland | 210/193 X |
| 3,735,872 | 5/1973 | Anderson | 210/193 X |
| 3,844,541 | 10/1974 | Artho et al. | 259/4 |

FOREIGN PATENTS OR APPLICATIONS

| | | | |
|---|---|---|---|
| 851,677 | 10/1960 | United Kingdom | 210/323 |

*Primary Examiner*—Charles N. Hart
*Assistant Examiner*—Robert H. Spitzer

[57] ABSTRACT

A separator for solid particles from a liquid, such as a dirty industrial machine tool coolant, comprising a settling tank with one or more frames or assemblies of horizontally extending tubular filters and means to removably clamp such frames against a side of the settling tank over suction outlets. Each of the filter frames comprises a chamber into which all of the tubular filters communicate, which chamber is provided with a gasket that is pressed against the vertical wall of the settling tank around an outlet therefrom. Socks may be provided for the tubular filters, which socks may contain seams that are aligned in vertical planes for the easy severance of the cakes of solid particles which build up upon them. A bottom drag out conveyor may be provided for the settling tank and a suction pump draws the liquid through the filters into an adjacent clean tank. When the coating of removed solid particles on the tubular filters becomes excessive, such as after a certain period of time and/or a predetermined vacuum occurs on the intake of the pump, the suction may be automatically shut down, and reverse pressure applied to the filters to bump off the cake that has formed on the filters so it can settle and be removed from the settling tank. If required, a precoat filter medium may be applied to the filters. This precoating filter medium or material may be fed from a hopper onto a screen where jets of liquid disperse it through the screen for introduction into the settling tank above each of the tubular filter frames for direct and rapid deposit on the filters to minimize loss due to settling.

29 Claims, 8 Drawing Figures

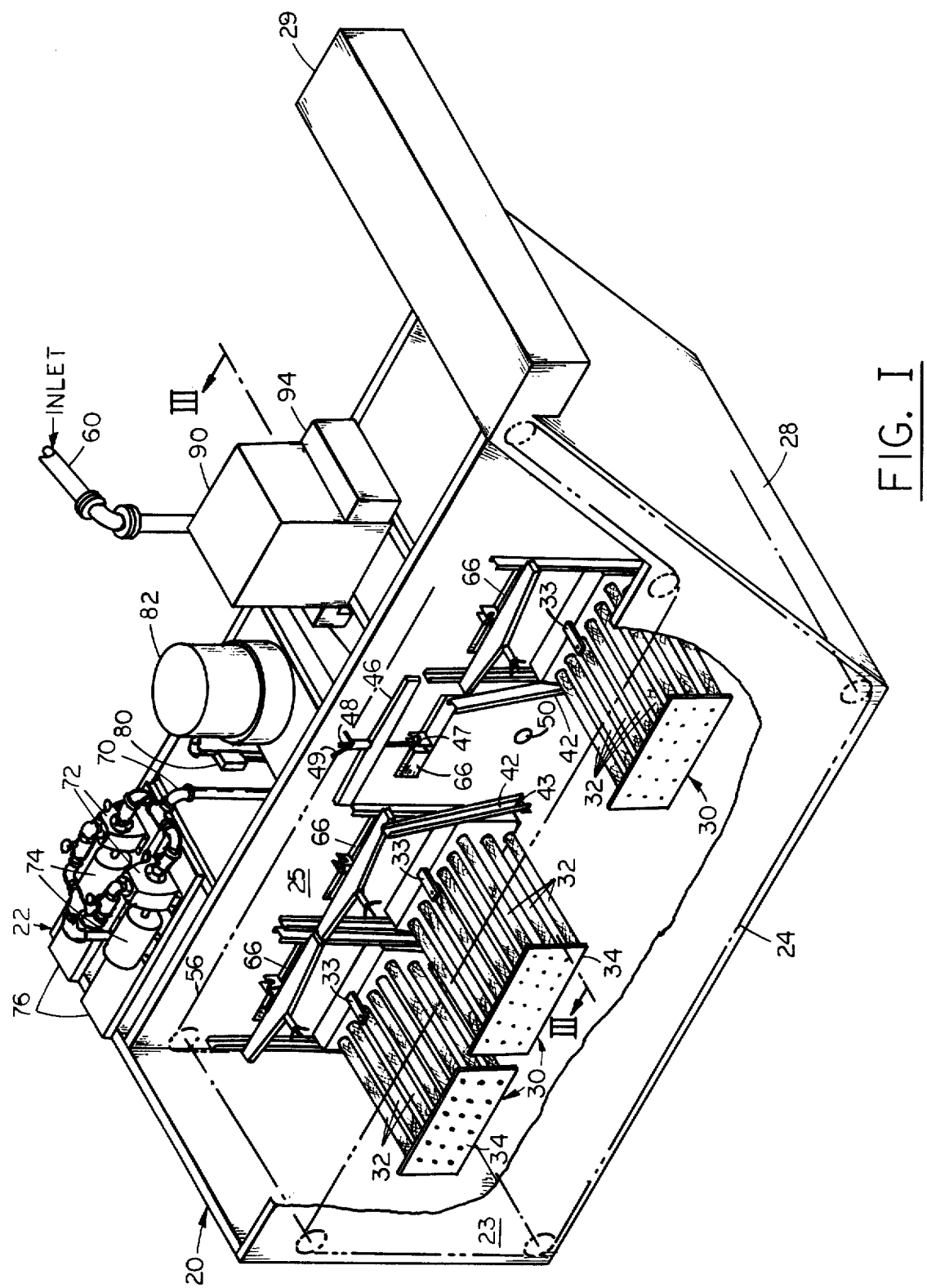
FIG. I

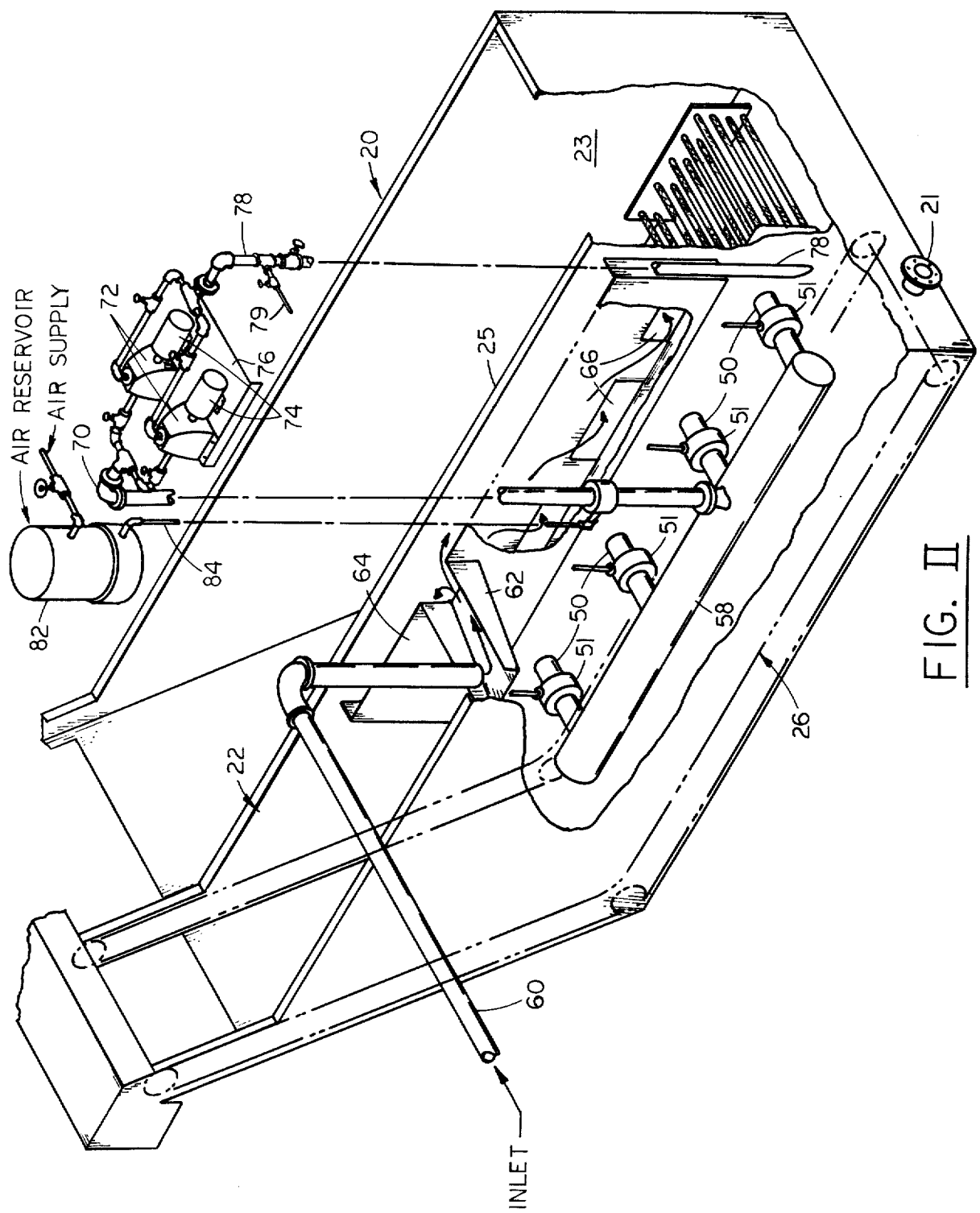

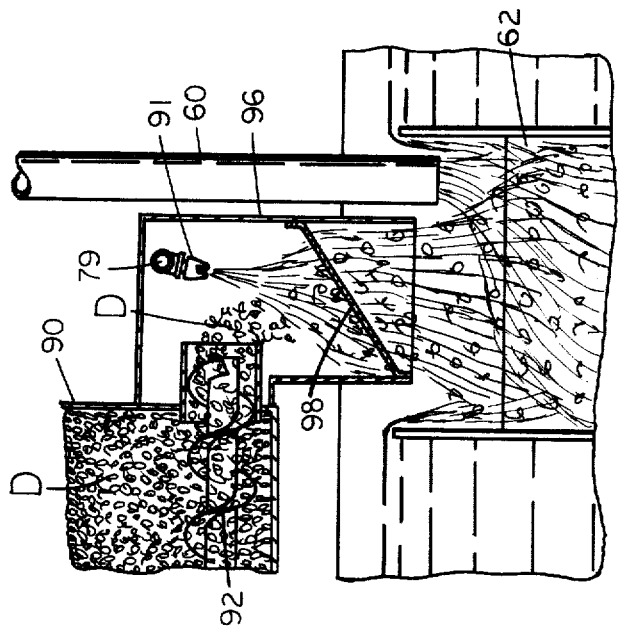
FIG. IV
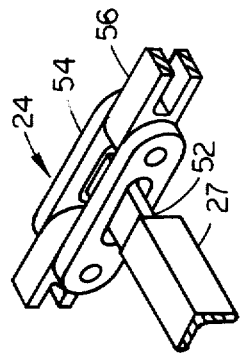
FIG. V
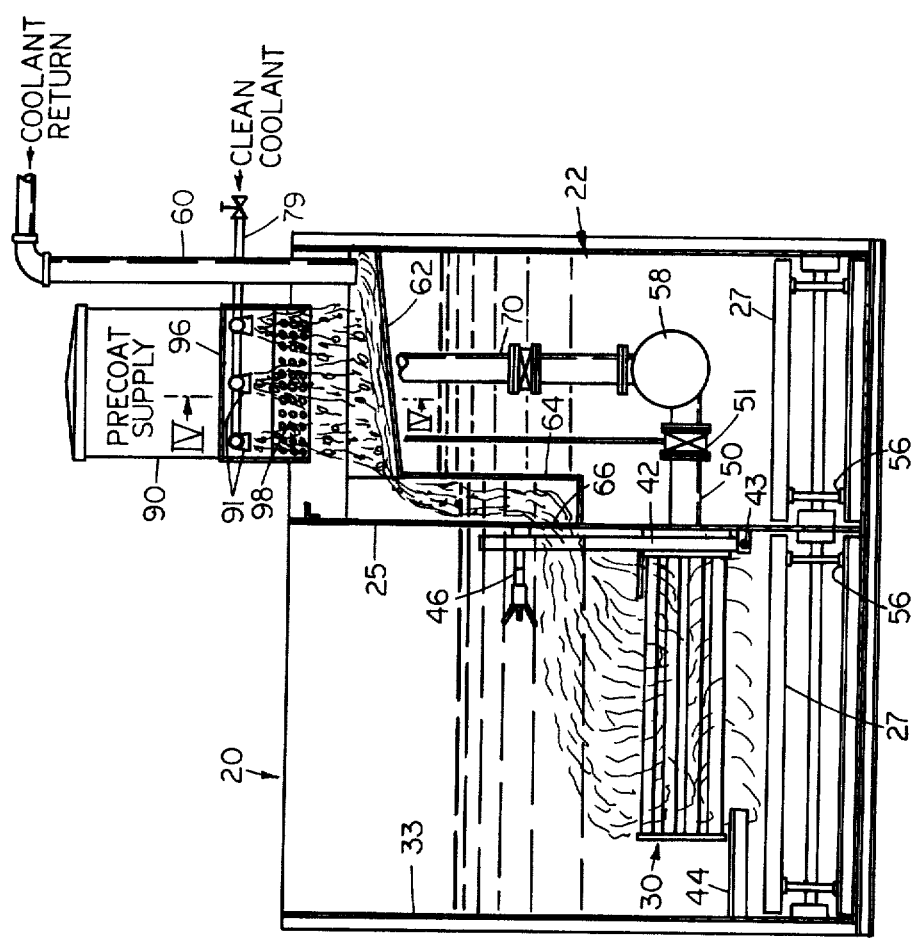
FIG. II

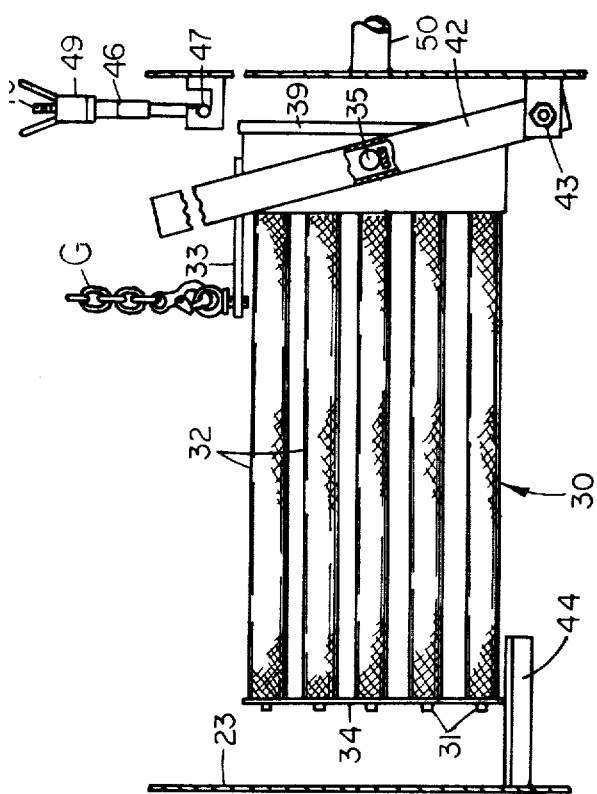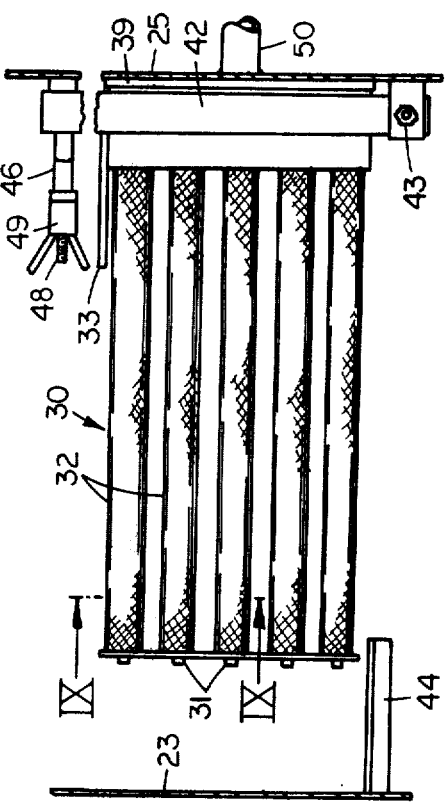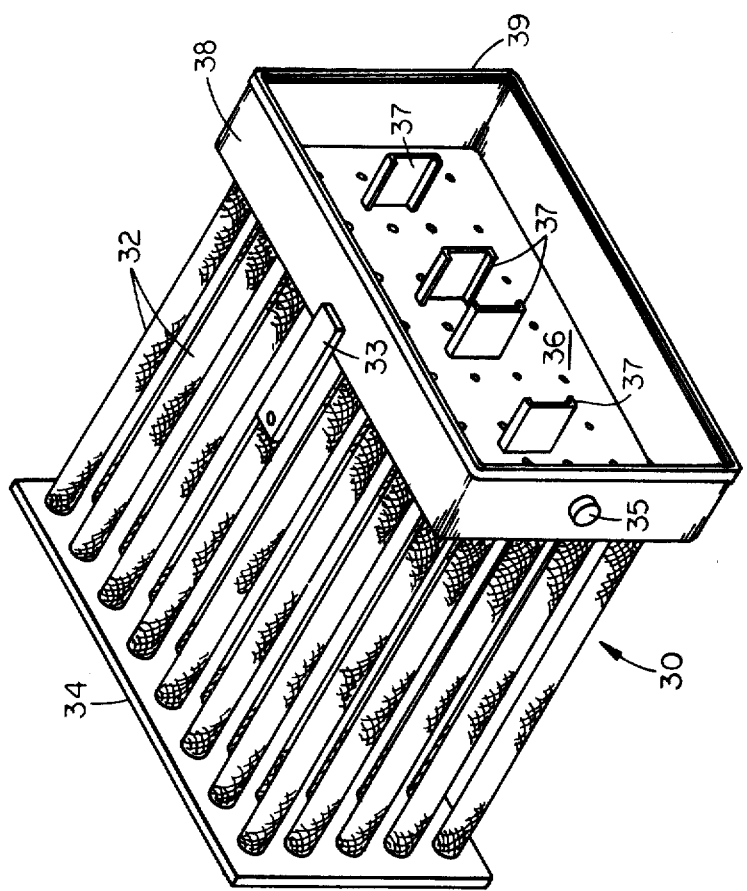

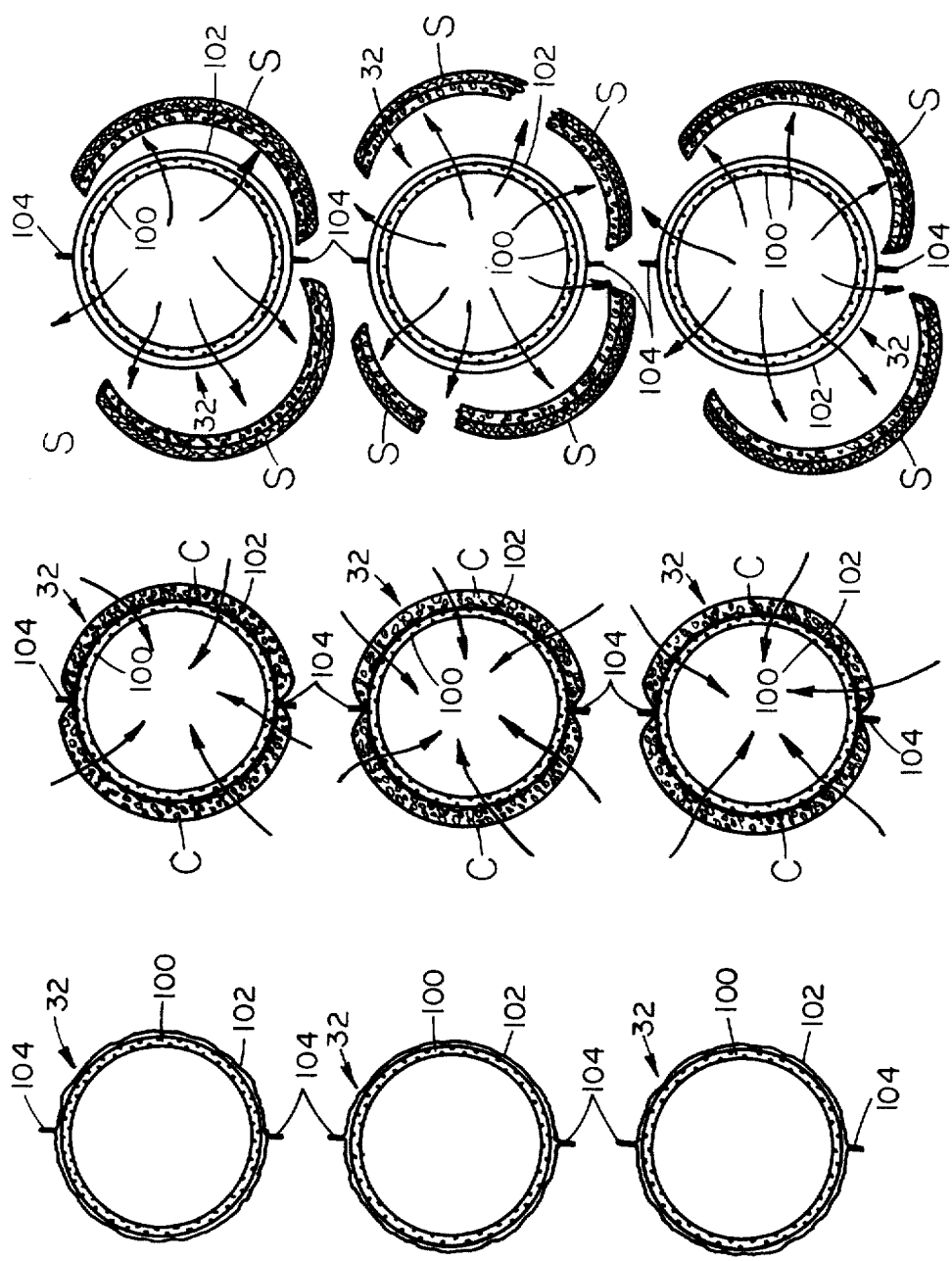

TUBULAR FILTER IN SETTLER

BACKGROUND OF THE INVENTION

Previously, settling tanks for the separation of solid particles from liquid which tanks also included filters, often had filters with vertically extending parallel tubes or plates, which filters became covered and/or bridged with the cakes of particles that did not detach from the socks on the filters, or fall off and settle to the bottom of the settling tank for removal. Furthermore these filters either had to be separately removed or they were mounted in a custer in a base which then could be removed for cleaning and replacement, but no protection for the filters themselves was provided, and very careful handling of the filters was required to avoid puncturing of the socks which were usually used over them. Also the whole system had to be shut down, the tank drained and even the piping disconnected in order to replace these filters.

Also if a precoat medium was used on such filters, it required a relatively long time for circulation of the liquid in the tank until substantially all of the precoat medium suspended in the liquid was deposited on the filters and much of it was lost by settling in the bottom of the tank.

SUMMARY OF THE INVENTION

Generally speaking, the removable filter frame for a settling tank of a solid-liquid separator according to this invention, overcomes the above mentioned difficulties by a combination of structural features including employing a plurality of tubular filters mounted horizontally in a frame or assembly with their single open tubular ends communicating with a chamber at one end of the frame. This chamber has an opening on the side of the frame which opening is provided with a peripheral gasket for sealing this chamber by clamping it against a vertical side wall of the settling tank over an outlet therefrom. A plurality of such units may be provided in the settling tank, and each of the outlets therefrom in the wall of the tank may be connected to a manifold through separate valve means, so that any one or all of the outlets may be closed, when a filter frame is to be removed, without having to drain the settling tank. A pair of pivoted guide levers may be provided for engagement with trunnions on each filter frame for locating the frame over its associated tank outlet, and a screw and bar means may be provided for clamping the frame in position. Socks may be provided for the tubular filters, which socks also may be provided with seams that are aligned in vertical parallel planes so that the material that accumulates on the socks does not accumulate at the seams as thickly, and then when back washing or bumping is employed, the cakes will break completely away from the tubes along the seams and not expand, hang, or bridge between adjacent tubes.

The back washing may be done at regular intervals by a timer, which timer may be overridden by a vacuum sensor when the suction on the outlet from the filters becomes greater than a predetermined amount, indicating that the cake is too thick to produce effective filtering. Under these circumstances the suction pump is immediately shut off, and a back pressure is applied as quickly as possible to all of the filters in the tank to knock off the cakes that have accumulated on them. This back pressure or bumping may be done by air pressure from a reservoir to first push clean liquid back through the filters, and then air if necessary. Then time is allowed to permit settling of the cakes to the bottom of the settling tank before starting the pump again. This delay in restarting the suction pump also permits the liquid in the tank to refill the lines to the pump and partially prime the pump before it is restarted.

Adjacent the settling tank there may be provided a clean tank for the liquid sucked from the filters, which clean tank acts as a reservoir for supplying the clean liquid during the times that the main tank is having its filters back washed and/or precoated.

If a precoater is used, it may comprise a bin for the precoating of solid particles, such as diatomaceous earth, which bin may have a plurality of screw conveyors or augers along its bottom for feeding out the precoat onto a slanting screen against which jets of clean liquid impinge for breaking up the particles and disbursing them in the liquid for conduction to inlets into the settling tank located above and adjacent each of the filter frames. Thereby a majority of the precoat particles will collect on the filters as rapidly as possible without loss by settling. As soon as the precoating medium has been built up in the filters, the separating operation is recommenced.

The flights of the bottom scraper conveyor which on their return reach may pass over the top of the filter frames in the settling tank, are provided with trunnions that easily slip into and out of the open links of the conveyor spocket chain, so that the flights may be readily removed without dismantling the conveyor chain when a filter frame is to be removed.

OBJECTS AND ADVANTAGES

Accordingly, it is an object of this invention to produce a simple, efficient, effective, economic, and sturdy solids-from-liquid filter for a settling tank.

Another object is to produce a settler which has a filter that is easily back washed, does not cause bridging of the cake between its filter elements, and which can easily be replaced without damage or shut down of the settler separator.

Another object is to provide a precoating device for a filter in a settling tank, wherein the time for precoating is materially reduced by being directly and rapidly applied to the filters.

Another object is to provide a sock with seams for tubular filter elements, which seams aid in the breaking away of the cake that accumulates on the sock.

BRIEF DESCRIPTION OF THE VIEWS

The above mentioned and other features, objects and advantages, and the manner of obtaining them are described more specifially below by reference to embodiments of the present invention shown in the accompanying drawings, wherein:

FIG. I is a perspective view of a settling tank with part of one side thereof broken away, showing a plurality of filter frames mounted against one of the vertical walls thereof and a drag out conveyor in its bottom according to one embodiment of this invention. Adjacent thereto is a clean tank upon which is mounted a precoating apparatus, an air bump backwashing apparatus, and a pair of suction pumps;

FIG. II is a schematic perspective view of the back of the apparatus shown in FIG. I also with one of its walls broken away showing the inlet and outlet ducts for the settling tank, and air bumping apparatus and pumps schematically spaced above the top of the settling tank;

FIG. III is a vertical section view along line III—III of FIG. I showing the inlet and outlet ducts adjacent a filter frame, and the precoating apparatus;

FIG. IV is an enlarged vertical section view taken along line IV—IV of FIG. III showing the feeding and dispersing means of the precoating apparatus;

FIG. V is an enlarged fragmentary perspective view of part of a drag out conveyor chain and the end of one of its flights trunnioned in the link of the chain;

FIG. VI is an enlarged perspective view of one of the filter frames shown in FIGs. I, II and III, looking into the chamber at the one end thereof that is clamped against the wall of the settling tank;

FIG. VII is a side elevation of the lowering in place of a filter frame as shown in FIG. VI showing its guiding, supporting and clamping means inside the settling tank;

FIG. VIII is a view similar to that shown in FIG. VII but with the filter frame in its operative position clamped against the wall of the settling tank; and FIGS. IX, X, and XI are enlarged schematic vertical sections of three vertically arranged filter tubes, such as along line IX—IX of FIG. VIII, showing, respectively, a seamed sock on the filter tubes with the seams aligned vertically, the accumulation of a precoat medium on the filter tubes, and the bumping off of the cake from the filter by back pressure, which breaks the cakes at their seams.

DETAILED DESCRIPTION OF PREFERRED EMBODIMENT

Referring first to FIGS. I and II, there is shown a settling tank 20 having an adjacent clean tank 22, both of which are provided with bottom drag out conveyors 24 and 26 which scrap settled particles by their flights 27 (see FIGS. III and V) up the inclined end 28 of both adjacent tanks 20 and 22. Over the upper edge of end 28 the solid particles are then dumped out under hood 29 for the removal, such as by a conveyor or a tote box (not shown).

A. FILTER ASSEMBLY

Submerged in the liquid in the settling tank 20, there are shown in FIG. I a plurality of filter assemblies or frames 30, comprising a plurality of horizontally extending tubular filters 32, the ends of which are clamped between and inside the peripheral edges of two horizontal plates 34 and 36 (see FIGS. VI and VII). The plate 34 closes the corresponding adjacent ends of all of the filter tubes 32 which herein are shown to be held to the plate by nuts 31 at the end of each tubular filter 32. The opposite end plate 36, forms the bottom of a tray-shaped chamber 38 into which all of the ends of the filter tube elements 32 communicate. The outer rim of this chamber 38 is provided with a gasket 39 and the inside of this chamber may be provided with bracing members 37 the height of the side walls of the chamber 38. Thus when the chamber 38 is clamped against the vertical wall 25 of the settling chamber 20 and sealed by the gasket 39 (see FIG. VIII), and suction is applied to the outlet duct 50 these bracing members 37 will prevent the plate 36 of the chamber 38 from bending or collapse. Each end of the chamber 38 is provided with a trunnion 35 which fits into a pair of channels 42 pivotally mounted at 43 on the settler wall 25 (see FIGS. I, VII and VIII) for guiding the chamber 38 and its associated filter frame 30 into the position as shown in FIG. VII before being clamped against the wall 25 over the outlet duct 50 as shown in FIG. VIII. There also may be attached to the side of the chamber 38 an eye or hook engaging plate 33 into which a hook or grapple such as G shown in FIG. VII may be connected for removal or replacement of the frame 30 into the tank 20.

On the opposite side wall 23 of the settling tank 20 there may be provided a bracket 44 as shown in FIGS. III, VII and VIII for supporting the outer end or plate 34 of the frame 30 for its installation as shown in FIG. VII. Once the frame is located as shown in FIG. VII, the clamping bar 46 (see FIG. I) is used which is centrally connected onto a threaded rod 48 with wing nut 49. This clamping assembly is also pivotally connected, such as by a hook means 47 to the wall 25 above the outlet duct 50, so that it can be swung downwardly with the ends of the bar 46 engaging the upper ends of the pivoted channels 42. Then when the wing nut 49 is tightened the whole assembly and filter frame 30 is tightly held against the wall 25, compressing the gasket 39 to prevent leakage into the chamber 38.

Anyone of these tubular filter frames 30 may be removed without draining the tank, by reversing the just described operations, but before doing so, its corresponding outlet valve 51 should be closed (see FIGS. II and III). These outlet valves 51 may be operated by extension rods therefrom to above the liquid level in the clean tank 22.

If the return reach of the bottom scrapper or drag out conveyor 24 passes over the top of the filter frames 30, the flights 27 (see FIG. V) of such conveyor can easily be removed, in that these flights 27 are provided with trunnions 52 at their ends, which slip into and out of the links 54 of the conveyor sprocket chain 56.

B. BACKWASH

In FIGS. I through IV there is shown the dirty liquid or contaminated coolant intake duct 60 which may enter a trough 62 that connects with a manifold type trough 64 along the outside of the wall 25 of the settling tank 20, which wall has a plurality of inlet openings 66 located above each of the filter frames 30, so that the liquid containing solid particles that is introduced into the settling tank 20 will pass the suction tubular filters 30 as soon as possible so as to remove as many of the solid particles as quickly as possible.

As shown in FIG. II the outlet manifold 58 of the outlet ducts 50 is connected to the suction input 70 of a pair of parallel pumps 72 (one of which is a stand-by), which pumps may be driven by separate electric motors 74. This pump assembly may be mounted on top of the platform 76 on the clean tank at 22 as shown in FIG. I. Discharge duct 78 from these pumps puts the clean liquid in the clean liquid tank 22, and may have a valved branch pipe at 79 (see FIGS. II and III) for connection to the precoat dispersing nozzles 91 described later. This clean liquid tank has an outlet duct 21 (see FIG. II) for the continuous recirculation of the liquid or coolant to where it collects solid particles for further separation by return through inlet duct 60.

After the solid particles removed from the contaminated liquid in tank 20 have accumulated on the filter tubes 32 for predetermined time and/or until a certain vacuum is sensed in the intake duct 70, such as by an adjustable timer-vacuum control means 80 shown in FIG. I, the operating pump 72 is shut off, so that a back pressure can be applied to the filter tubes 30. This back pressure for back washing may comprise a bump air pressure from the air pressure reservoir 82 as shown in FIGS. I and II connected via duct 84 to the outlet manifold 58 or duct 70, to first push clean liquid back through the filter 30, and then air, if necessary to break all the cake off of the top of the tubes 32 in a manner such as that shown in FIG. XI. The same or another adjustable timer control means 80 is provided for preventing the start up of the pump 72 for a predetermined period of time so as to allow the broken off cakes S from the tubes 32 to settle to the bottom of the settling tank 20 for removal by the drag out conveyor 24. This delay also permits liquid to seep back up through the filter tubes 32 into the chamber 38 and ducts 58 and 70 to at least partially prime the pump 72 before it is restarted.

C. PRECOAT

The next step in the operation may be to introduce a precoating medium or material D, such as diatomaceous earth, onto the filter tubes 32, which solid precoat material D is stored in the bin 90 (see FIGS. I, III and IV). This powdered or fine solid material D may be fed from the bottom of the bin 90 by an odd number of screw conveyors or screw augers 92 along the bottom of the hopper, that alternately rotate in opposite directions by means by a motor and gearing mechanism which is enclosed in the housing 94 (see FIG. I). The outer augers 92 are always feeding augers while the adjacent oppositely rotating auger or augers is for maintaining even distribution of the precoat material D in the bin 90. The feeding augers 92 discharge the material D into a hopper 96 (see FIGS. III and IV) which has a sloping screen or perforated plate 98 at its bottom, against which the particles D drop and are broken up by jets from the nozzles 91. These nozzles 91 are fed with liquid under pressure from the outlet duct 78 and the valved duct 79 from the pump 72, which pump now has been started after the predetermined period of time for the settling of the cakes S has expired. These jet nozzles 91 not only break up the particles of precoat D but also disperse them in the liquid so that they pass through the screen 98 and into the trough 62 for distribution through the manifold trough 64 and openings 66 above each of the filter frames 30, so that the precoat D suspended in the liquid will accumulate on the tubes 32 as quickly as possible in a manner such as that shown in FIG. X to form coating C. By introducing this precoat solid D directly over the filters 30, the time for circulation of the liquid to apply the required coating C is reduced to about one quarter of what would be required if the precoat suspended liquid were introduced in a remote corner of the settling tank 20. Thus, after several minutes, usually between 2 and 5 minutes, a sufficient precoat C is built up on the tubes 32 so that the precoating apparatus may be shut off and the valve closed in by-pass duct 79, until another cake S is built up on the tubular filters 32.

Since the settling tank 20 and clean tank 22 have sufficient capacity, the flow of dirty and clean liquid to and from the separator continues during the backwashing and precoating operations. These operations may be either manually or automatically controlled, or a combination of both.

Referring to FIGS. IX, X and XI, there are shown cross-sections of three vertically disposed tubular filter elements 32 as they occur in one of the frames 30, in three successive stages of their operation. Each tubular filter 32 comprises primarily a perforated cyclindrical tube 100 around which may be and preferably is placed a fabric or flexible porous sock 102. In this embodiment, this sock 102 is provided with overlapping flange type seams 104 that are aligned in the same vertical plane for all of the vertically disposed tubes 100. These seams prevent too much accumulation of the cakes S along them so that when the socks are blown back or backwashed as shown in FIG. XI, the cakes S will be sure to break off at these flanges 104 and fall clear and not on or over any filter tubes below it. If desired, the adjacent flanges 104 can be connected so that the whole sock may be composed of two sheets sewn together along parallel lines to form pockets in which a plurality of tubes are simultaneously placed. Such seam tubes are primarily desirable for cohering filter cakes S as shown in FIG. XI. In the event the filter cakes are not coherent masses and not tend to cover or bridge adjacent filter tubes, then of course smooth socks without the seams 104 may be used.

It is to be clearly understood that the structural shapes and sizes of the tubular filters, filter frames, and settling tank shown in this invention may vary and be used for separating solid particles from liquids other than coolants without departing from the scope of this invention. Furthermore, the tubular filters may in some instances be used without socks and/or without precoating material. Also the means for blowing back or knocking off the cake periodically may not even be necessary for some solids which would automatically fall off the tubular filters after a certain thickness of cake had accumulated.

While there is described above the principles of this invention in connection with specific apparatus it is to be clearly understood that this description is made only by way of example and not as a limiation to the scope of this invention.

I claim:

1. In an apparatus for separating solid particles from a liquid comprising: a settling tank having an apertured side wall, a filter in said settling tank, and pump means for sucking said liquid through said filter from said tank, the improvement comprising:
   A. an assembly having an open sided chamber and a plurality of horizontal tubular filter elements comprising said filter communicating with said chamber,
   B. releasable clamping means for holding the open side of said chamber in fluid tight communication with said side wall around said aperture in said side wall of said tank, and
   C. duct means connecting said aperture to said pump means.

2. An apparatus according to claim 1 wherein the open side of said chamber includes a gasket means for sealing said chamber to said side wall around said aperture.

3. An apparatus according to claim 1 wherein said tubular filter elements comprise perforated tubes surrounded with flexible porous socks.

4. An apparatus according to claim 3 wherein said socks are provided with diametrical opposite outwardly extending flange seams.

5. An apparatus according to claim 4 wherein a plurality of said elements with seamed socks have their seams vertically aligned in common and parallel planes.

6. An apparatus according to claim 1 wherein said clamping means comprises a pair of channels pivoted to said side wall of said tank, and said assembly comprises a pair of trunnions slidable in said channels for guiding said assembly into position adjacent said aperture.

7. An apparatus according to claim 6 wherein said clamping means includes wing and bar means engageable with the outer ends of said channels for urging and holding said assembly against said side wall of said tank.

8. An apparatus according to claim 1 wherein said settling tank includes a bottom drag out conveyor.

9. An apparatus according to claim 8 wherein said conveyor comprises a pair of parallel spocket chains, transverse flights between said chains, and means for removably seating the ends of said flights in the links of said chains.

10. An apparatus according to claim 1 including a plurality of said assemblies in said tank, and an outlet manifold duct connected to the apertures in the side wall provided for each of said assemblies for connection to said pump means.

11. An apparatus according to claim 1 including a clean tank adjacent said settling tank for the discharge of liquid from said pump means.

12. An apparatus according to claim 1 including an air pressure reservoir for back pressuring said filters for bumping off the cakes of solid particles that accumulate thereon.

13. An apparatus according to claim 1 including means for coating said filter elements with a filter medium.

14. An apparatus according to claim 1 including means for automatically back washing and precoating said filter elements periodically during the separating operation of said apparatus.

15. A precoating apparatus for a separator for solid particles from a liquid, comprising: a settling tank, a filter in said tank, a pump means connected to said filter to suck liquid from said tank through said filter, and means connected to the connection of said pump to said filter to backwash said filter, said precoating apparatus for said filter comprising:
   A. a supply bin for a solid particle precoating material,
   B. a plurality of auger means for feeding said precoating material from a supply bin,
   C. hopper means for receiving said fed precoating material and having a slanting perforated bottom screen,
   D. nozzle means directing jets of liquid downwardly onto said precoating material on said screen for dispersing said material in said liquid, and
   E. duct means for directing the resulting suspended precoating material in said liquid from said hopper into said tank adjacent and vertically above said filter.

16. An apparatus according to claim 15 wherein said nozzle means is connected to said pump means.

17. An apparatus according to claim 15 wherein said filter comprises a plurality of horizontal tubular filters mounted in a frame removably connected to the side wall of said settling tank.

18. A separator for solid particles in a liquid, comprising:
   A. a settling tank having
      a. a vertical wall with an outlet therein,
      b. means for removing the settled particles from the bottom of said tank, and
      c. filter means in said tank attached to said vertical wall,
   B. a clean liquid tank adjacent said settling tank,
   C. pump means connected to said outlet for removing liquid from said settling tank through said filter means into said clean tank,
   D. means for precoating said filter means with a suspended filtration medium, and
   E. means connected to said outlet for backwashing said filter means to remove periodically accumulated particles on said filter means for settling in said settling tank;
   the improvement comprising:
      in said filter means:
         a. a plurality of parallel tubular filter elements mounted horizontally inside said settling tank,
         b. a chamber connected to one end of all said elements and to said outlet in the wall of said settling tank,
         c. means attached to said wall for removably holding said chamber against said outlet in said wall, and
         d. gasket means around an aperture in said chamber for insuring a fluid type seal between said chamber and side wall of said settling tank around said outlet; and
      in said precoating means:
         a. means for dispersing said precoat medium in said liquid from said pump means,
         b. duct means for directing liquid containing said precoat medium to above and adjacent said filter means for direct deposit on said filter means; and
   F. means for controlling the cycle of operation of said separator for periodically backwashing and precoating said filter means.

19. A separator for solid particles in a liquid, comprising:
   A. a settling tank having
      a. a vertical wall with an outlet therein,
      b. means for removing the settled particles from the bottom of said tank, and
      c. filter means in said tank attached to said vertical wall,
   B. a clean liquid tank adjacent said settling tank,
   C. pump means connected to said outlet for removing liquid from said settling tank through said filter means into said clean tank, and
   D. means connected to said outlet for backwashing said filter means to remove periodically accumulated particles on said filter means for settling in said settling tank;
   the improvement comprising:
      in said filter means:
         a. a plurality of parallel tubular filter elements mounted horizontally inside said settling tank,
         b. a chamber connected to one end of all said elements and to said outlet in the wall of said settling tank,
         c. means attached to said wall for removably holding said chamber against said outlet in said wall, and
         d. gasket means around an aperture in said chamber for insuring a fluid type seal between said chamber and side wall of said settling tank around said outlet.

20. An apparatus according to claim 19 wherein said tubular filter elements comprise perforated tubes surrounded with flexible porous socks.

21. An apparatus according to claim 20 wherein said socks are provided with diametrical opposite outwardly extending flange seams.

22. An apparatus according to claim 19 wherein said clamping means comprises a pair of channels pivoted to said side wall of said tank, and said assembly comprises a pair of trunnions slidable in said channels for guiding said assembly into position adjacent said outlet.

23. An apparatus according to claim 22 wherein said clamping means includes means engageable with the outer ends of said channels for urging and holding said assembly against said side wall of said tank.

24. An apparatus according to claim 19 wherein said settling tank includes a bottom drag out conveyor.

25. An apparatus according to claim 24 wherein said conveyor comprises a pair of parallel spocket chains, transverse flights between said chains, and means for removably seating the ends of said flights in the links of said chains.

26. An apparatus according to claim 19 including a plurality of said assemblies in said tank, and an outlet manifold duct connected to the outlets in the side wall provided for each of said assemblies for connection to said pump means.

27. An apparatus according to claim 19 including an air pressure reservoir for back pressuring said filters for bumping off the cakes of solid particles that accumulate thereon.

28. An apparatus according to claim 19 including means for automatically back washing said filter elements periodically during the separating operation of said apparatus.

29. An apparatus according to claim 19 including means for coating said filter elements with a filter medium.

* * * * *

UNITED STATES PATENT OFFICE
CERTIFICATE OF CORRECTION

PATENT NO. : 3,935,105
DATED : Jan. 27, 1976
INVENTOR(S) : Stephen N. McEWEN

It is certified that error appears in the above-identified patent and that said Letters Patent are hereby corrected as shown below:

| | | |
|---|---|---|
| Col. 1, | line 45, | cancel "," |
| Col. 2, | line 30, | change "spocket" to - - sprocket - - |
| | line 54, | change "specifially" to - - specifically - - |
| Col. 3, | line 2, | change "section" to - - sectional - - |
| | line 35, | change "scrap" to - - scrape - - |
| Col. 4, | line 29, | change "scrapper" to - - scraper - - |
| | line 34, | change "spocket" to - - sprocket - - |
| Col. 6, | line 35, | change "limiation" to - - limitation - - |
| Col. 7, | line 13, | change "spocket" to - - sprocket - - |
| Col. 9, | line 18, | change "spocket" to - - sprocket - - |

Signed and Sealed this twenty-fifth Day of May 1976

[SEAL]

Attest:

RUTH C. MASON
Attesting Officer

C. MARSHALL DANN
Commissioner of Patents and Trademarks

REEXAMINATION CERTIFICATE (211th)

United States Patent [19]

McEwen

[11] B1 3,935,105

[45] Certificate Issued Jun. 19, 1984

[54] TUBULAR FILTER IN SETTLER

[75] Inventor: Stephen N. McEwen, Bowling Green, Ohio

[73] Assignee: Henry Filters, Inc., Bowling Green, Ohio

Reexamination Requests:
No. 90/000,340, Mar. 4, 1983
No. 90/000,366, May 3, 1983

Reexamination Certificate for:
Patent No.: 3,935,105
Issued: Jan. 27, 1976
Appl. No.: 523,035
Filed: Nov. 12, 1974

Certificate of Correction issued May 25, 1976.

[51] Int. Cl.³ .................. B01D 27/12; B01D 29/32
[52] U.S. Cl. ........................... 210/138; 210/193; 210/237; 210/333; 210/411; 210/416.1
[58] Field of Search .................. 210/108, 138–140, 210/143, 193, 206, 207, 230, 232, 236–238, 323.2, 333.01, 338, 339, 411, 412, 416.1, 445, 447, 450, 453, 459, 460, 462, 497.1, 527, 233–235, 416.2–416.5, 435–444, 446, 448, 449, 451, 452, 454–458, 461, 463; 55/480, 493, 502, 507, 509

[56] References Cited

U.S. PATENT DOCUMENTS

| | | | |
|---|---|---|---|
| 73,751 | 1/1868 | Palmer . | |
| 401,930 | 4/1889 | Cooper et al. . | |
| 420,136 | 1/1890 | Willis | 210/457 X |
| 619,569 | 2/1899 | Hewel | 210/458 |
| 646,464 | 4/1900 | Schutte | 210/452 |
| 1,023,488 | 4/1912 | Zahm . | |
| 1,160,154 | 11/1915 | Ellis . | |
| 1,579,171 | 3/1926 | Zoul . | |
| 1,696,735 | 12/1928 | Scoville | 210/323 |
| 1,706,400 | 3/1929 | Diamond . | |
| 1,716,040 | 6/1929 | Genter . | |
| 1,755,482 | 4/1930 | Lomax | 210/436 X |
| 1,793,080 | 2/1931 | Glover . | |
| 2,214,671 | 9/1940 | Hagan | 210/177 |
| 2,359,138 | 9/1944 | Martin | 68/18 |
| 2,360,278 | 10/1944 | Robertson | 210/454 X |
| 2,366,903 | 1/1945 | Harms et al. | 210/152 |
| 2,381,462 | 8/1945 | Naugle | 210/153 |
| 2,399,887 | 5/1946 | Olson | 210/184 |
| 2,413,954 | 1/1947 | Conterman | 210/454 X |
| 2,494,535 | 1/1950 | Armstrong | 210/184 |
| 2,559,614 | 7/1951 | Hapman | 210/457 X |
| 2,576,288 | 11/1951 | Fink et al. | 210/201 |
| 2,605,903 | 8/1952 | Schuller | 210/180 |
| 2,670,847 | 3/1954 | Egloff et al. | 210/1.5 |
| 2,679,936 | 6/1954 | Bench | 210/199 |
| 2,715,466 | 8/1955 | Esposito | 210/199 |
| 2,720,314 | 10/1955 | Booth | 210/193 |
| 2,722,315 | 11/1955 | Hapman | 210/460 X |
| 2,784,846 | 3/1957 | Olson et al. | 210/184 |
| 2,795,332 | 6/1957 | Burla | 210/437 X |
| 2,862,622 | 12/1958 | Kircher, Jr. et al. | 210/411 X |
| 2,877,901 | 3/1959 | Maus | 210/391 |
| 2,887,228 | 5/1959 | Harlan et al. | 210/108 |
| 2,904,652 | 9/1959 | Crane et al. | 200/84 |
| 2,909,285 | 10/1959 | Besler | 210/323 |
| 2,916,148 | 12/1959 | Crane et al. | 210/527 |
| 2,925,913 | 2/1960 | Wheeler, Jr. | 210/444 X |
| 2,940,595 | 6/1960 | Crane | 210/333 |
| 2,970,696 | 2/1961 | Mummert | 210/138 |
| 2,982,415 | 5/1961 | Contreras | 210/448 X |
| 2,986,232 | 5/1961 | Wiley | 183/44 |
| 3,037,634 | 6/1962 | Mills | 210/323 |
| 3,042,214 | 7/1962 | Arvanitakis | 210/459 X |
| 3,050,192 | 8/1962 | Beutler | 210/488 |
| 3,151,065 | 9/1964 | Smith et al. | 210/193 |
| 3,172,846 | 3/1965 | Hirs | 210/75 |
| 3,194,399 | 7/1965 | Harms | 210/104 |
| 3,214,369 | 10/1965 | Felix | 210/24 |
| 3,228,528 | 1/1966 | Mummert et al. | 210/333 |
| 3,244,282 | 4/1966 | Rosaen | 210/234 X |
| 3,273,715 | 9/1966 | Rosaen | 210/234 X |
| 3,280,980 | 10/1966 | King | 210/108 |
| 3,300,094 | 1/1967 | Rockola | 259/4 |

(List continued on next page.)

FOREIGN PATENT DOCUMENTS

| | | | |
|---|---|---|---|
| 546341 | 11/1922 | France | 210/460 |
| 1153899 | 3/1958 | France | 210/445 |
| 851677 | 10/1960 | United Kingdom | 210/323 |

*Primary Examiner*—Robert H. Spitzer

[57] ABSTRACT

A separator for solid particles from a liquid, such as a dirty industrial machine tool coolant, comprising a settling tank with one or more frames or assemblies of horizontally extending tubular filters and means to removably clamp such frames against a side of the settling tank over suction outlets. Each of the filter frames comprises a chamber into which all of the tubular filters communicate, which chamber is provided with a gasket that is pressed against the vertical wall of the settling tank around an outlet therefrom. Socks may be provided for the tubular filters, which socks may contain seams that are aligned in vertical planes for the easy severance of the cakes of solid particles which build up upon them. A bottom drag out conveyor may be provided for the settling tank and a suction pump draws the liquid through the filters into an adjacent clean tank. When the coating of removed solid particles on the tubular filters becomes excessive, such as after a certain period of time and/or a predetermined vacuum occurs on the intake of the pump, the suction may be automatically shut down, and reverse pressure applied to the filters to bump off the cake that has formed on the filters so it can settle and be removed from the settling tank. If required, a precoat filter medium may be applied to the filters. This precoating filter medium or material may be fed from a hopper onto a screen where jets of liquid disperse it through the screen for introduction into the settling tank above each of the tubular filter frames for direct and rapid deposit on the filters to minimize loss due to settling.

U.S. PATENT DOCUMENTS

| | | | |
|---|---|---|---|
| 3,332,553 | 7/1967 | Casson | 210/103 |
| 3,334,749 | 8/1967 | Ladd | 210/145 |
| 3,337,055 | 8/1967 | Starnes et al. | 210/416.1 X |
| 3,341,023 | 9/1967 | Seter | 210/237 |
| 3,377,783 | 4/1968 | Young | 55/302 |
| 3,493,115 | 2/1970 | Koches | 210/447 X |
| 3,559,809 | 2/1971 | Barmore | 210/416.1 X |
| 3,635,343 | 1/1972 | Holland | 210/193 |
| 3,680,699 | 8/1972 | MacPherson | 210/75 |
| 3,720,322 | 3/1973 | Harms | 210/238 |
| 3,727,643 | 4/1973 | Blackmore | 138/41 |
| 3,735,872 | 5/1973 | Anderson | 210/193 |
| 3,844,541 | 10/1974 | Artho et al. | 259/4 |

REEXAMINATION CERTIFICATE ISSUED UNDER 35 U.S.C. 307.

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 15–18 is confirmed.

Claims 1, 2 and 19 are determined to be patentable as amended:

Claims 3–14 and 20–29, dependent on amended claims, are determined to be patentable.

1. In an apparatus for separating solid particles from a liquid comprising: a settling tank having an apertured side wall, a filter in said settling tank, and pump means for sucking said liquid though said filter from said tank, the improvement comprising:
   A. an assembly having an open sided chamber and a plurality of horizontal tubular filter elements comprising said filter communicating with said chamber, *a gasket interposed between the assembly and the side wall,*
   B. releasable clamping means for *displacing said assembly in a direction normal to the tank side wall, the displacement of said assembly (1) compressing the gasket and (2)* holding the open side of said chamber in fluid tight communication with said side wall around said aperture in said side wall, and
   C. duct means connecting *said aperture directly to the intake of* said pump means.

2. An apparatus according to claim 1 wherein the open side of said chamber includes [a] *the* gasket means for sealing said chamber to said side wall around said aperture.

19. A separator for solid particles in a liquid, comprising:
   A. a settling tank having
      a. a vertical wall with an outlet therein,
      b. means for removing the settled particles from the bottom of said tank, and
      c. filter means in said tank attached to said vertical wall,
   B. a clean liquid tank adjacent said settling tank,
   C. pump means *having its intake directly* connected to said outlet for removing liquid from said settling tank through said filter means into said clean tank, and
   D. means connected to said outlet for backwashing said filter means to remove periodically accumulated particles on said filter means for settling in said settling tank;
   the *separator further* [improvement] comprising:
   in said filter means:
      a. a plurality of parallel tubular filter elements mounted horizontally inside said settling tank,
      b. a chamber connected to one end of all said elements and to said outlet in the wall of said settling tank,
      c. *releasable clamping* means attached to said wall for *displacing said chamber in a direction normal to said vertical wall and for* removably holding said chamber against said outlet in said wall, and
      d. gasket means around an aperture in said chamber *and compressible upon displacement of said chamber* for insuring a fluid type seal between said chamber and side wall of said settling tank around said outlet.

* * * * *